(12) United States Patent
Bacorn

(10) Patent No.: US 11,892,098 B2
(45) Date of Patent: Feb. 6, 2024

(54) AIRFLOW BALANCING VALVE WITH ACTUATOR

(71) Applicant: Greenheck Fan Corporation, Clearwater, FL (US)

(72) Inventor: Cory Robert Bacorn, Marion, NC (US)

(73) Assignee: Greenheck Fan Corporation, Schofield, WI (US)

( * ) Notice: Subject to any disclaimer, the term of this patent is extended or adjusted under 35 U.S.C. 154(b) by 0 days.

(21) Appl. No.: 17/200,180

(22) Filed: Mar. 12, 2021

(65) Prior Publication Data

US 2022/0260178 A1 Aug. 18, 2022

Related U.S. Application Data

(60) Provisional application No. 63/150,726, filed on Feb. 18, 2021.

(51) Int. Cl.
| | |
|---|---|
| *F16K 37/00* | (2006.01) |
| *F24F 13/14* | (2006.01) |
| *F16K 31/53* | (2006.01) |
| *F24F 11/74* | (2018.01) |
| *F16K 1/22* | (2006.01) |

(52) U.S. Cl.
CPC ............ *F16K 37/0058* (2013.01); *F16K 1/22* (2013.01); *F16K 31/535* (2013.01); *F24F 11/74* (2018.01); *F24F 13/1426* (2013.01)

(58) Field of Classification Search
CPC ...... F16K 37/0058; F16K 1/22; F16K 31/535; F24F 11/74; F24F 13/1426

USPC .................................. 137/487, 487.5, 492.5
See application file for complete search history.

(56) References Cited

U.S. PATENT DOCUMENTS

| | | | | |
|---|---|---|---|---|
| 3,065,950 | A | * | 11/1962 | Goldberg .................. F16K 1/24 251/85 |
| 5,169,121 | A | | 12/1992 | Blanco et al. |
| 5,195,719 | A | * | 3/1993 | Ball ....................... F16K 27/029 251/308 |
| 6,082,704 | A | * | 7/2000 | Grinbergs ............... F16K 1/221 251/96 |
| 6,198,243 | B1 | | 3/2001 | Ritmanich et al. |
| 6,698,445 | B2 | | 3/2004 | Zelczer |
| 7,140,593 | B2 | | 11/2006 | Pearson et al. |

(Continued)

FOREIGN PATENT DOCUMENTS

| | | |
|---|---|---|
| WO | 00/01991 A1 | 1/2000 |
| WO | 2015/028777 A1 | 3/2015 |

(Continued)

OTHER PUBLICATIONS

"How VAV Boxes Work/HVAC Zoning" highperformancehvac.com (Oct. 30, 2017) <https://highperformancehvac.com/how-do-vav-boxes-work-commercial-hvac-systems/>.

(Continued)

*Primary Examiner* — Angelisa L. Hicks
(74) *Attorney, Agent, or Firm* — Banner & Witcoff, Ltd.

(57) ABSTRACT

An airflow valve may comprise a plate assembly located inside an airflow conduit. An actuator may be attached to, and/or otherwise fixed relative to, a plate of the plate assembly. The actuator may be coupled to the airflow conduit. If activated, the actuator may react against the airflow conduit to induce rotation of the plate.

20 Claims, 14 Drawing Sheets

(56) References Cited

U.S. PATENT DOCUMENTS

| | | |
|---|---|---|
| 7,967,669 B2 | 6/2011 | Baik |
| 8,038,075 B1 | 10/2011 | Walsh |
| 8,430,731 B2 | 4/2013 | Bamberger |
| 8,951,103 B2 | 2/2015 | Votaw et al. |
| 9,568,207 B2 | 2/2017 | Du et al. |
| 9,777,942 B2 | 10/2017 | Hill |
| 9,835,354 B2 | 12/2017 | Yoskowitz |
| 9,845,965 B2 | 12/2017 | Lehnert et al. |
| 10,203,703 B2 | 2/2019 | Ashton et al. |
| 10,423,172 B2 | 9/2019 | Niederhauser et al. |
| 2015/0253781 A1* | 9/2015 | Ashton ............ F16K 15/033 454/256 |
| 2019/0129451 A1 | 5/2019 | Ashton et al. |
| 2019/0176564 A1* | 6/2019 | Running ............ B60H 1/322 |
| 2019/0212023 A1 | 7/2019 | Michaud et al. |
| 2019/0286170 A1 | 9/2019 | Ashton et al. |
| 2019/0376614 A1 | 12/2019 | Carlson et al. |
| 2019/0376707 A1 | 12/2019 | Emmons et al. |
| 2019/0376721 A1 | 12/2019 | Carlson et al. |
| 2020/0033022 A1 | 1/2020 | Damizet et al. |

FOREIGN PATENT DOCUMENTS

| | | |
|---|---|---|
| WO | 2016/153371 A1 | 9/2016 |
| WO | 2019184506 A1 | 10/2019 |

OTHER PUBLICATIONS

"CFSD-222-1-PB, 20×8" webrepswholesale.com (Accessed Nov. 16, 2020) <https://www.webrepswholesale.com/product/LLCFSD222-1PB20x8/contact.html#X7N4ehNKhTY>.

"FSD-211M" greenheck.com (Accessed Nov. 16, 2020) <https://www.greenheck.com/products/air-control/dampers/fsd-211m>.

* cited by examiner

AIRFLOW BALANCING VALVE WITH ACTUATOR

CROSS REFERENCE TO RELATED APPLICATION

This application claims priority to U.S. provisional patent application No. 63/150,726, titled "Airflow Balancing Valve With Actuator," and filed Feb. 18, 2021. Application No. 63/150,726, in its entirety, is incorporated by reference herein.

BACKGROUND

Airflow valves may be used for balancing of heating, ventilation, and air conditioning (HVAC) systems. In an HVAC system, it may be desirable to control volumes of air flow (e.g., measured in cubic feet per minute (CFM)) in different parts of the system. If an airflow valve is in a difficult-to-access location, making adjustments to that airflow valve may inconvenient and/or difficult.

SUMMARY

This Summary is provided to introduce a selection of some concepts in a simplified form as a prelude to the Detailed Description. This Summary is not intended to identify key or essential features.

An airflow valve may comprise a plate assembly located inside an airflow conduit. The plate assembly may comprise a valve plate and an adjustment plate. The adjustment plate and the valve plate may be rotatable relative to the airflow conduit. The valve plate may be rotatable relative to the adjustment plate and may be biased toward a rotational position against or near the adjustment plate. An actuator may be attached to, and/or otherwise fixed relative to, the adjustment plate. The actuator may be coupled to an interior surface of the airflow conduit. If activated, the actuator may react against the airflow conduit to induce rotation of the adjustment plate. To reduce interference with airflow, the actuator and/or components coupling the actuator to the airflow conduit may be located downstream of a rotational axis of the adjustment plate (e.g., between that rotational axis and an outlet of the airflow conduit).

These and other features are described in more detail below.

BRIEF DESCRIPTION OF THE DRAWINGS

Some features are shown by way of example, and not by way of limitation, in the figures of the accompanying drawings and in which like reference numerals refer to similar elements.

DETAILED DESCRIPTION

An airflow valve to control airflow volume may comprise a plate assembly that is rotatably mounted inside an airflow conduit. The plate assembly may comprise an adjustment plate that may be set in a position corresponding to a desired volume of airflow. The plate assembly may further comprise a valve plate that is biased toward the adjustment plate. In response to an increase in inlet/outlet pressure differential that is above a level corresponding to the adjustment plate rotational position (e.g., the setting of the airflow valve), the valve plate may rotate away from the adjustment plate to prevent significant rise in airflow volume.

In many HVAC applications, it may be desirable to frequently change a setting of an airflow valve. It may be desirable to change that setting multiple times throughout a single day. For example, it may be useful to reduce a volume of cooled air being delivered to a room while that room is unoccupied, while a side of a building with that room is not directly exposed to sun, and/or at other times. Continuing with the example, it may similarly be useful to increase a volume of cooled air being delivered to that room while it is occupied, while a side of a building with that room is directly exposed to sun, etc. However, manually changing settings for an airflow valve may be inconvenient and/or difficult (e.g., if the valve is located in a difficult-to-access portion of the system).

To reduce inconvenience and/or difficulty associated with changing settings, an airflow valve may comprise a powered actuator that may be operated remotely. Advantageously, the actuator may be placed inside an airflow conduit of the airflow valve. Internal placement of the actuator in the airflow conduit avoids placement of the actuator in external locations (e.g., on an outer surface of a housing) that may interfere with placement of the airflow valve in certain ducts or other spaces. Internal actuator placement allows a robust, simplified coupling of the actuator to an adjustment plate and to an airflow valve housing. To reduce interference with airflow, the actuator and/or components coupling the actuator to the airflow conduit may be positioned downstream of an adjustment plate rotational axis (e.g., between that axis and an outlet of the airflow conduit). By locating an actuator on a distal portion of adjustment plate, the actuator may out of an airflow path under many settings of the airflow valve.

Figure 1A:
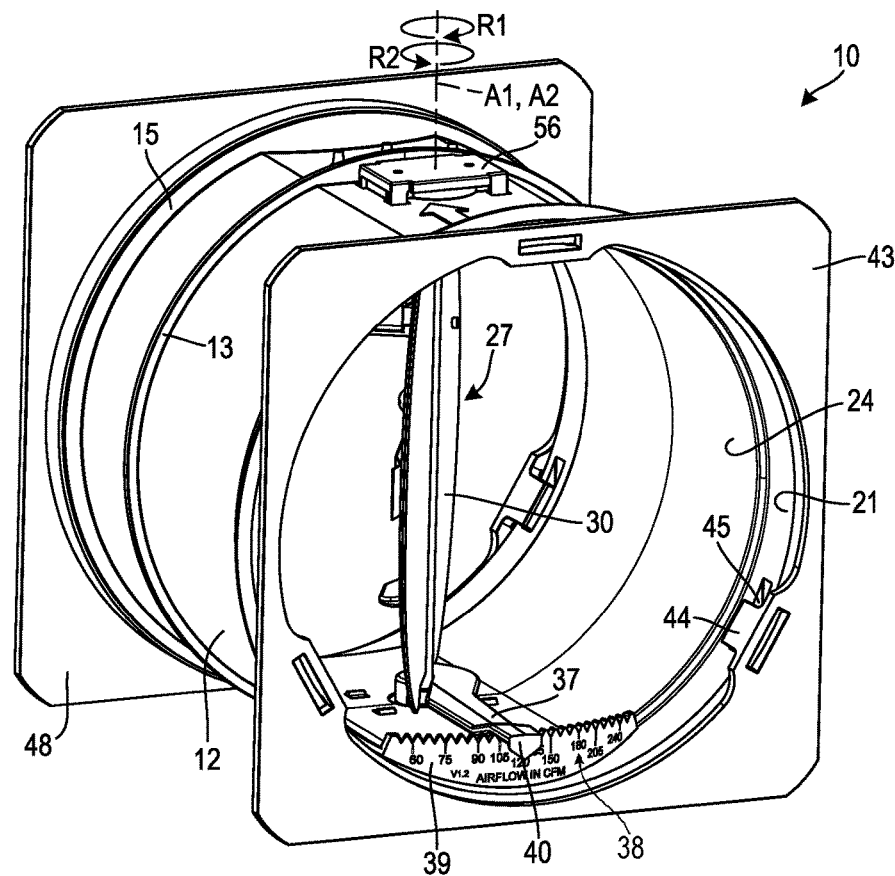
FIG. 1A is an upper front perspective view of an example airflow balancing valve.
Figure 1B:
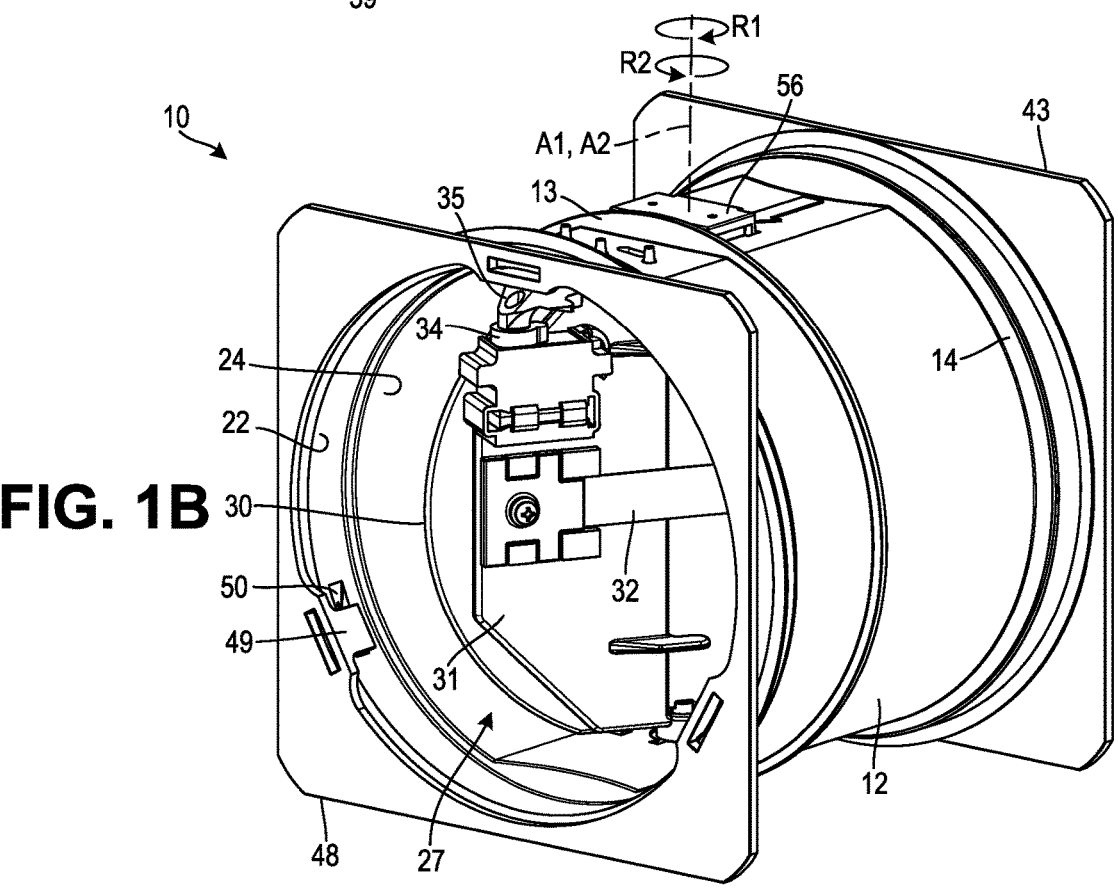
FIG. 1B is an upper rear perspective view of the airflow balancing valve of FIG. 1A.

FIG. 1A is an upper front perspective view of an airflow valve 10 that may comprise an internally-placed actuator for remote adjustment of an airflow setting for the valve 10. FIG. 1B is an upper rear perspective view of the airflow valve 10. The airflow valve 10 may comprise a housing 12. The housing 12 and/or other components of the valve 10 may be injection molded or otherwise formed from one or more polymer materials such as, for example, polypropylene, acrylonitrile butadiene styrene (ABS), polylactic acid (PLA), polyethylene terephthalate (PET), polyethylene terephthalate glycol (PETG), and/or Nylon. The housing 12 may have a shape that is approximately cylindrical. For example, and as shown in FIGS. 1A and 1B, a main portion of the housing 12 may have a shape of a cylinder with top and bottom sides that have been flattened. A circular central strengthening rib 13, a circular enlarged front end 14, and circular enlarged rear end 15 may also be molded or otherwise formed as part of the housing 12.

An open front end of the housing 12 may define an inlet 21. An open rear end of the housing 12 may define an outlet 22. An interior surface of the housing 12 may define an airflow conduit 24 that extends between the inlet 21 and the outlet 22. As explained in more detail below, the valve 10 may be adjusted to control air flow, from the inlet 21 to the outlet 22, via the airflow conduit 24. For convenience, a direction from the inlet 21 to the outlet 22 will therefore be referred to as a downstream direction.

A plate assembly 27 may be rotatably mounted to the housing 12 inside of the airflow conduit 24. The plate assembly 27 may comprise a valve plate 30, an adjustment plate 31, a spring 32, an actuator 34, an actuator gear 35, and an actuator housing (described below). The plate assembly 27 may further comprise an indicator arm 37. The indicator arm 37, which may be integrally formed with and/or otherwise fixed relative to the adjustment plate 31, may extend toward the inlet 21 and comprise a distal end. The distal end may be positioned over an arcuate indicator gauge 39. The indicator gauge 39 may include markings 38 that indicate airflow volumes corresponding to different settings (e.g., different rotational positions) of the adjustment plate 31. An end face 40 of the distal end may comprise a point that indicates, by pointing to a marking on the indicator gauge 39, an airflow volume corresponding to a setting of the adjustment plate.

A front flange 43 may be attached to a front end of the housing 12 by flexible arms 44 that extend rearward from the front flange 43. Each of the arms 44 may include a tooth (not visible in FIG. 1A) that extends radially outward from a center of the flange 43 and that rest in a slot 45 near the front edge of the housing 12. Similarly, a rear flange 48 may be attached to a rear end of the housing 12 by flexible arms 49 that extend forward from the rear flange 48. Each of the arms 49 may include a tooth (not visible in FIG. 1B) that rests in a slot 50 near the rear edge of the housing 12. The flanges 43 and/or 48 may be attached to the airflow valve 10 to help secure the airflow valve 10 in a duct, plenum or other passage having a square cross-section. One or both of the flanges 43 and 48 may be omitted and/or may be replaced with a flange having a different shape, for example, to facilitate placement in a duct having a non-square cross-section. For example, one of both of the flanges 43 and 48 could be replaced with flange having a shape of a rectangle with two sides longer than the other two sides.

Figure 2:
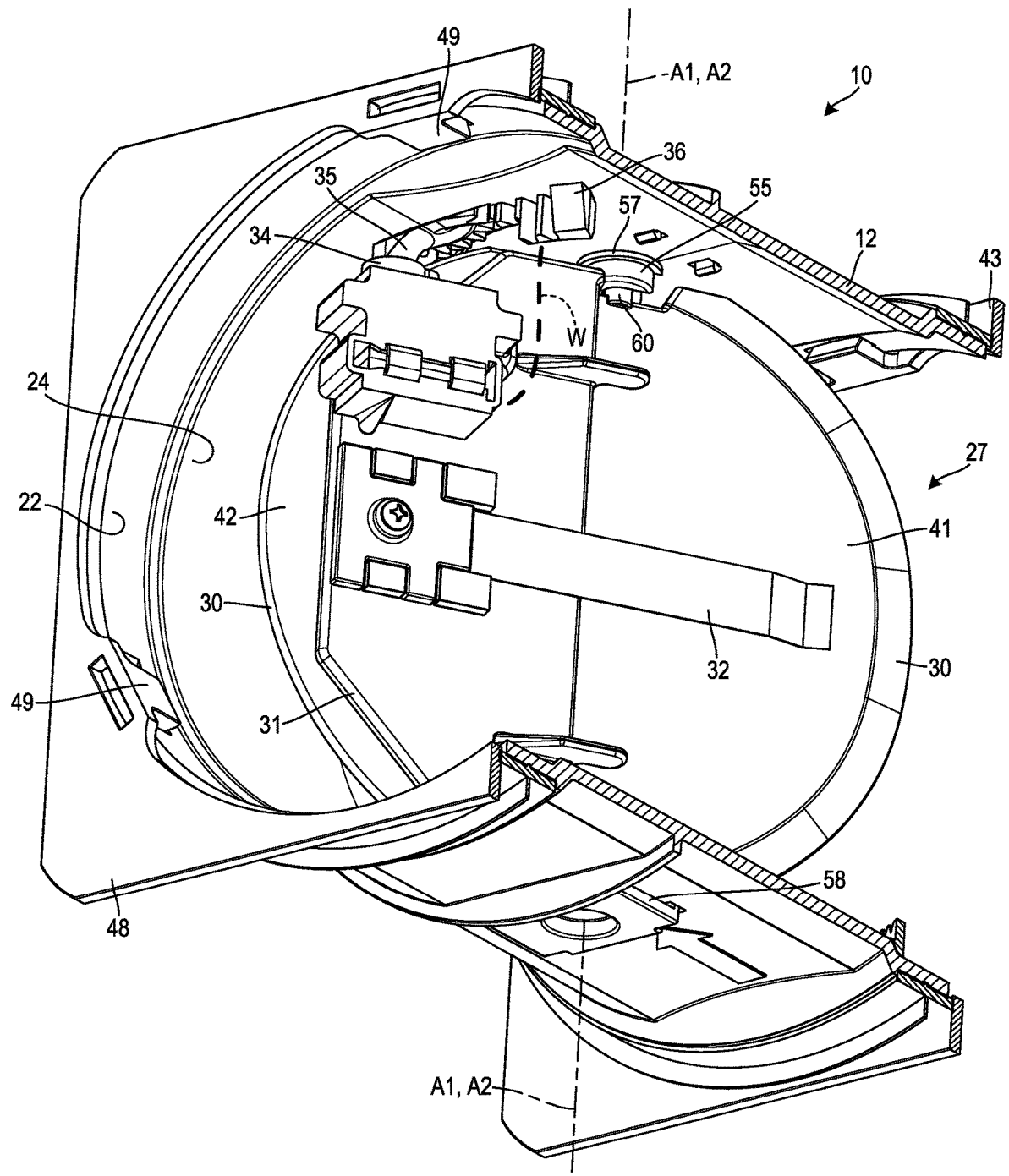
FIG. 2 is an enlarged lower rear perspective view of the airflow balancing valve of FIG. 1A, and with certain right side outer portions omitted to show internal details.

FIG. 2, which is slightly enlarged relative to FIGS. 1A and 1B, is a lower rear perspective view of the airflow balancing valve 10. Right side portions of the front flange 43, the housing 12, and the rear flange 48 have been omitted to expose additional internal details within the airflow conduit 24. The plate assembly 27 is rotatably mounted inside the airflow conduit 24. The adjustment plate 31 comprises an upper axle 55. An upper portion of the upper axle 55 (not visible in FIG. 2) rests in a corresponding hole (also not visible in FIG. 2) in the top side of the housing 12. That upper portion of the axle 55 is rotatable within that hole. A flange 57 of the axle 55 acts as a stop to limit the upward travel of the axle 55 through the hole in the housing 12. As shown in FIGS. 1A and 1B, a cap 56 may be snap fit onto a top side the housing 12 to cover the hole through which the axle 55 extends.

A lower bearing 58 may be snap fit onto the lower side of the housing 12. The lower bearing 58 may comprise a portion that protrudes through an opening in the bottom side of the housing 12, and that may comprise a pin on which a lower axle of the adjustment plate 31 rests. The lower axle of the adjustment plate 31 rotatable about that pin. Additional details of the lower bearing 58 and of the lower axle of the adjustment plate 31 are shown in subsequent drawing figures.

The valve plate 30 comprises an upper axle 60 that rests in, and is able to rotate within, a space formed in the upper axle 55 of the adjustment plate 31. Although not visible in FIG. 2, the valve plate 30 also comprises a lower axle that rests in, and is able to rotate within, a space formed in the lower axle of the adjustment plate 31.

By virtue of the rotatability of the upper axle 55 and the lower axle of the adjustment plate, the adjustment plate 31 is rotatable, relative to the housing 12, about an adjustment plate rotational axis A1. By virtue of the rotatability of the upper axle 60 and the lower axle of the valve plate 30, the valve plate 30 is rotatable, relative to the housing 12 and relative to the adjustment plate 31, about a valve plate rotational axis A2. In the example of the airflow valve 10, axes A1 and A2 coincide. In other example airflow valves, and as described below, an adjustment plate rotational axis and a valve plate rotational axis may not coincide, but may still be parallel. The axes A1 and A2 may be offset from a longitudinal centerline of the conduit 24 (e.g., extending through the center of the conduit 24 from the inlet 21 to the outlet 22). For example, the axes A1 and A2 may be located to the left of the longitudinal centerline. This allows a first portion 41 of the valve plate 30, which may extend upstream from the axis A2 toward the inlet 21, to be larger than a second portion 42, which may extend downstream from the axis A2 toward the outlet 22.

The actuator gear 35 may be fixed relative to a rotatable shaft of the actuator 34. The actuator gear 35 contacts a conduit gear 36 fixed to the housing 12. In response to an electrical input signal sent to the actuator 34, the actuator gear 35 rotates and, as explained in more detail below, reacts against the conduit gear 36 to move the adjustment plate 31 to a rotational position. Movement of the adjustment plate 31 may also move the valve plate 30 if a pressure differential between the inlet 21 and the outlet 22 is below a level corresponding to the rotational position of the adjustment plate.

Figure 3:
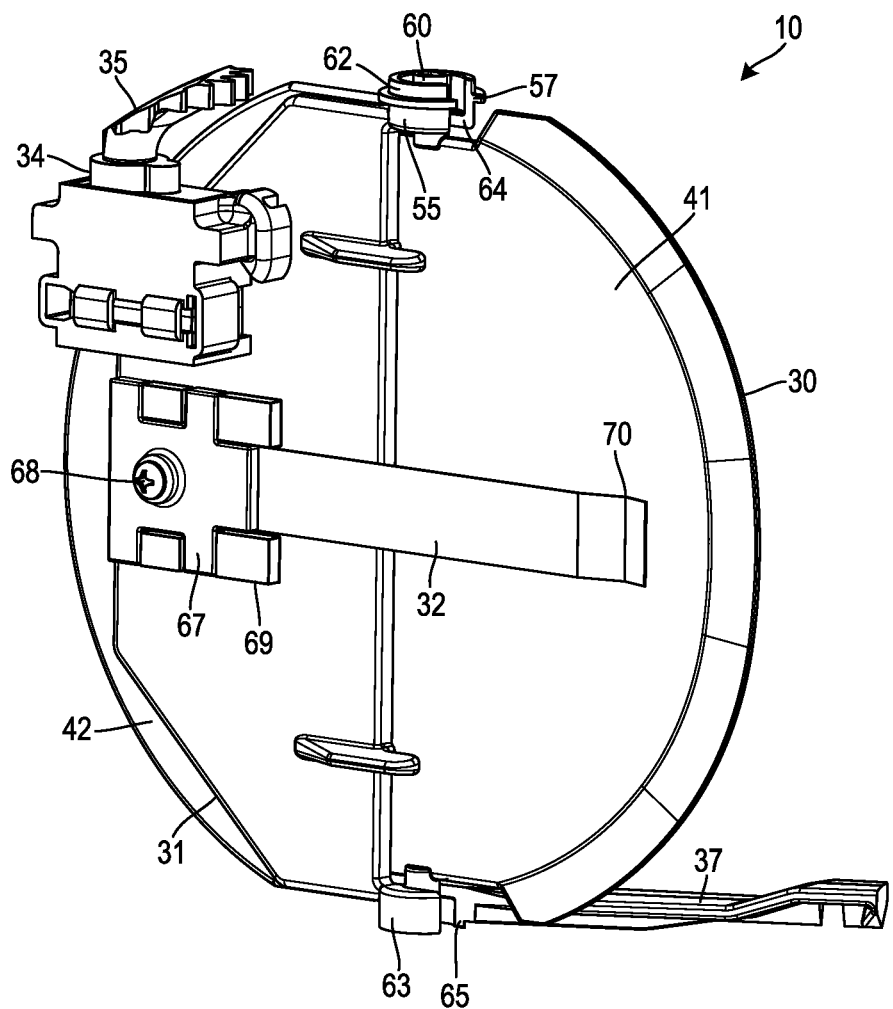
FIG. 3 is a front perspective view of a plate assembly of the example airflow balancing valve of FIG. 1A.

FIG. 3 is a front perspective view of a plate assembly 27 removed from the airflow valve 10. An upper portion 62, of the upper axle 55 of the adjustment plate 31, extends above the flange 57. The upper portion 62 may rest in a hole in the housing 12 of an assembled airflow valve 10. A lower axle 63 of the adjustment plate 31 may be partially cup-shaped. A cavity in the underside of the lower axle 63 may rest on a pin of the lower bearing 58. The upper axle 55 and the lower axle 63 may comprise respective side slots 64 and 65. The upper axle 60 of the valve plate 30 may be installed in a space in the upper axle 55 via the slot 64. The lower axle of the valve plate 30 may be installed in a space in the lower axle 63 via the slot 65.

The adjustment plate 31 may extend downstream from the axis A1 toward the outlet 22. A first end of the spring 32 may be fixed relative to the adjustment plate 31 by a clamp 67 held in place by a screw 68. The clamp may fit within a bracket 69 that further restrains the first end of the spring 32. A remaining portion of the spring 32 may extend across the axes A1 and A2 and over the first portion 41 of the valve plate 30, with a second end 70 of the spring 32 positioned to contact the first portion 41. The spring 32 may bias the valve plate 30 to a rotational home position in which the second portion 42 is pushed toward and/or against the adjustment plate 31. As explained in more detail below, this bias may be overcome if the pressure at the inlet 21, relative to the outlet 22, rises above a level associated with an airflow volume corresponding to the rotational position of the adjustment plate 31.

Figure 4:
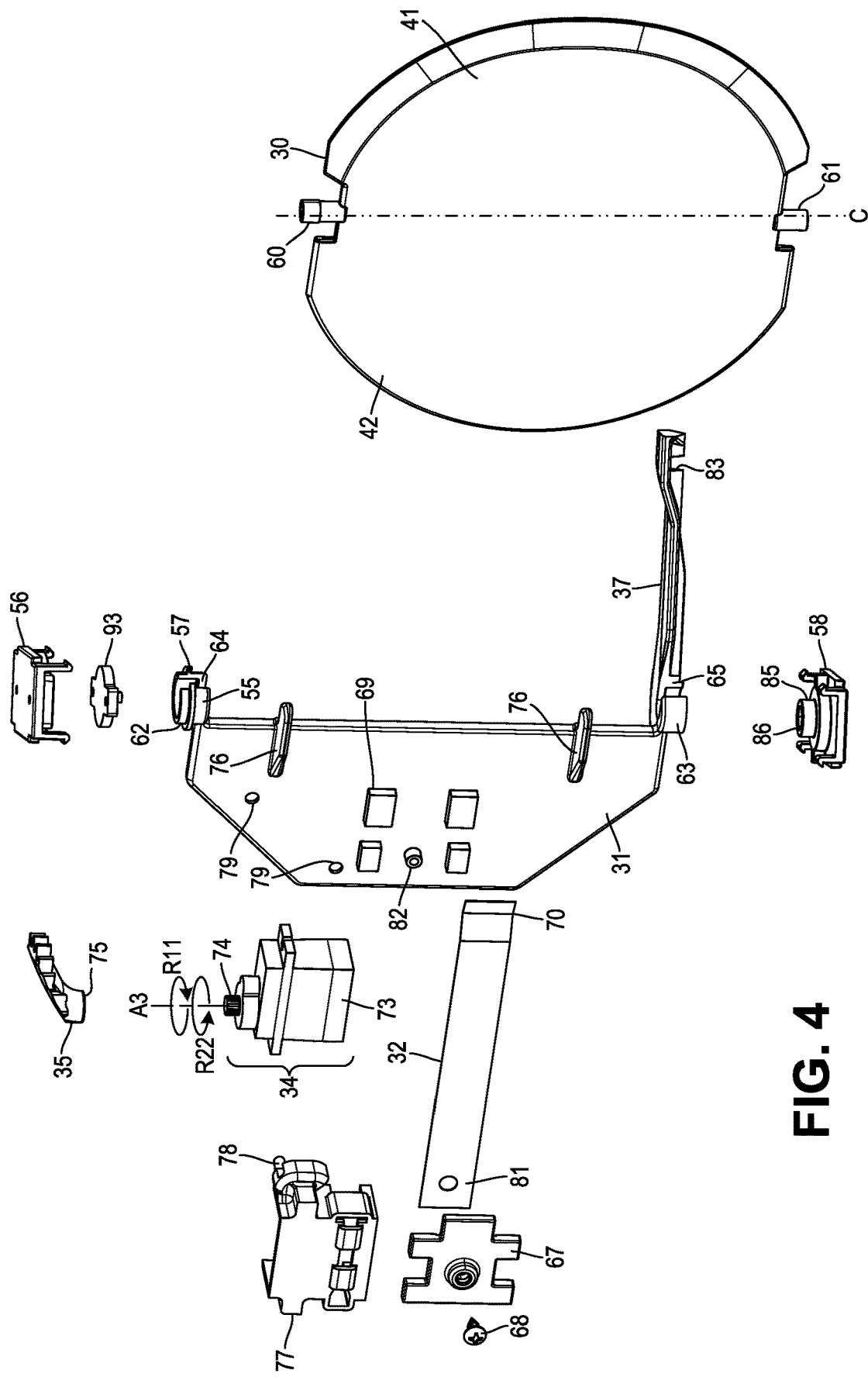
FIG. 4 is an exploded view of the plate assembly of FIG. 3.

FIG. 4 is an exploded view of the plate assembly 27. Also included in FIG. 4 are the cap 56 and the lower bearing 58. The actuator 34 may comprise a main body 73 and a shaft 74. The main body may contain a motor, control circuitry, a rotational encoder to detect the rotational position of the shaft 74, and/or other components. The actuator 34 may comprise a commercially available servo. An example of such a servo is the SG90 9G micro servo that is commercially available from numerous sources. One or more wires, not shown in FIG. 4, may extend from the main body 73 and may be used to provide power and control signals to the actuator 34. Such wires may be routed through an opening in the top side of the housing 12 (an example routing of such a wire is indicated in FIG. 2 by the broken line labelled W). The shaft 74 may be coupled to a motor of the servo, either directly or via reduction gears (also internal to the housing 73). When power and an appropriate control signal is applied to the actuator 34, the shaft 74 may rotate, relative to the housing 73, about an axis A3. The actuator 34 may be controllable to control the amount of rotation of the shaft in either of rotational directions R11 and R22.

The actuator gear 35 may be attached to the shaft 74 by inserting the shaft 74 into a hole 75 in the underside of the actuator gear 35. The shaft 74 may have gear teeth or other features that interlock with features in the hole 75 to prevent rotation of the shaft 74 relative to the hole 75. Also or alternatively, the actuator gear 35 may be fastened using a screw (or other mechanical fastener) and/or glued onto the shaft 74.

The actuator 34 may be attached to the adjustment plate 31 by an actuator housing 77. The actuator housing 77 may be molded and/or otherwise formed to comprise interior features that correspond to exterior features of the housing 73, and that securely hold the actuator 34 in position. The housing 77 may include mounting posts 78, only one of which is visible in FIG. 4. The mounting posts 78 may be inserted into holes 79 in the adjustment plate 31 during assembly. After insertion into the holes 79, ends of the mounting posts 78 protruding through the opposite side of the adjustment plate 31 may flattened (e.g., with a heated tool) to prevent withdrawal of the mounting posts 78 from the holes 79. Also or alternatively, the housing 77 may be glued to the adjustment plate 31.

The bracket 69 may comprise blocks formed on the face of the access panel 31 that define spaces to receive a first end 81 of the spring 32 and to interlock with the clamp 67, as well as a post 82 configured to protrude through a hole in the first end 81 and to receive the screw 68. The indicator arm 37 may be integrally formed with and/or otherwise fixed relative to the adjustment plate 31. A gap 83 formed in the underside of the arm 37 allows the arm 37 to move over the indicator gauge 39 without interference. In the assembled airflow valve 10, the indicator gauge 39 is positioned so that it rests in the gap 83 as the adjustment plate 31 rotates about axis A1. The adjustment plate 31 may also include stops 76 that are integral to and/or otherwise attached to the adjustment plate 31. Portions of the stops 76 extending beyond an edge of the adjustment plate 31 may contact a face of the valve plate 30 to prevent excessive rotation of the valve plate 30 relative the adjustment plate 31, and thereby avoid plastic deformation of the spring 32 that might result from excessive rotation.

The valve plate 30 comprises the upper axle 60 and a lower axle 61. The first portion 41 of the valve plate 30, which in FIG. 4 is located to the right of a centerline C extending through the centers of the axles 60 and 61, may extend toward the inlet 21 in the assembled airflow valve 10. The second portion 42 of the valve plate 30, which in FIG. 4 is located to the left of the centerline C, may extend toward the outlet 22 in the assembled airflow valve 10. On each face of the valve plate 30, the portion of that face corresponding to the first portion 41 may have a larger area that the portion of that face corresponding to the second portion 42.

As explained above, the axle 60 and the axle 61 may respectively be installed into the axles 55 and 63 via the slots 64 and 65. In the assembled airflow valve 10, the axle 60 may be located in the center of the axle 55, and the top portion 62 of axle 55 may rotatable rest in a hole in the top of the housing 12. Optionally, the cap 56 may include a downward-facing post that fits into a hole in the center of the axle 60. Also or alternatively, a rotational damper 93 may be installed on the top of the housing 12 and may contact the top of the axle 60 to slow and/or dampen rotational motion of the valve plate 30. The rotational damper 93 may, for example, rest in a cavity (e.g., on the top of the housing 12) that conforms to the shape of the damper 93. The axle 60 may have an end feature (e.g., a D-shaped hole in the top of the axle 60) that interfaces with a corresponding feature of the damper 93. In the assembled airflow valve 10, the axle 63 may be positioned over the post 85 of the lower bearing 58, with the post 85 resting in an opening on the underside of the axle 63. The axle 61 may rest in a hole 86 in the post 85.

Figure 5A:
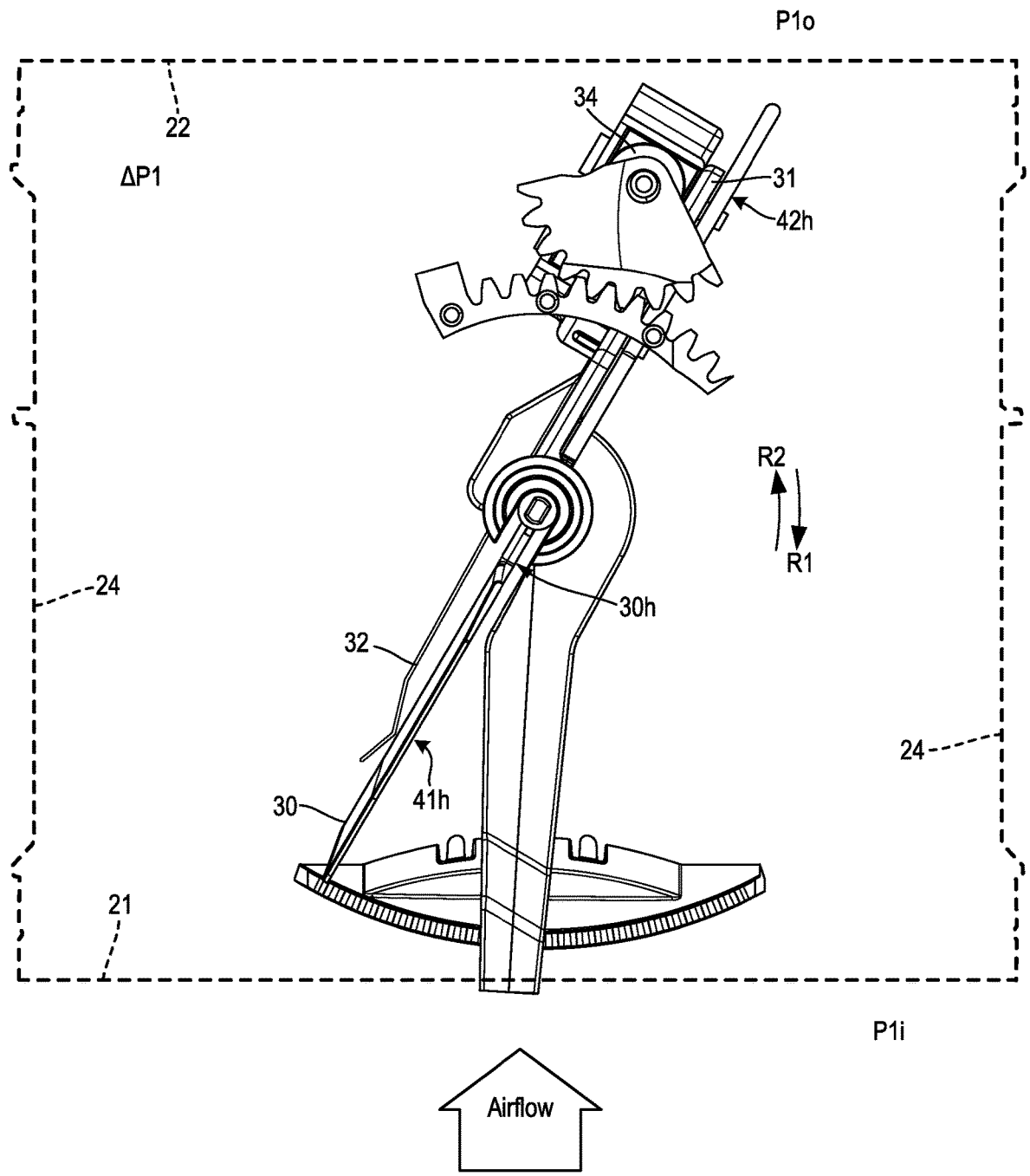
FIG. 5A is a top view of the plate assembly of FIG. 3, and with boundaries of an airflow conduit of the valve of FIG. 1A shown in broken lines.
Figure 5B:
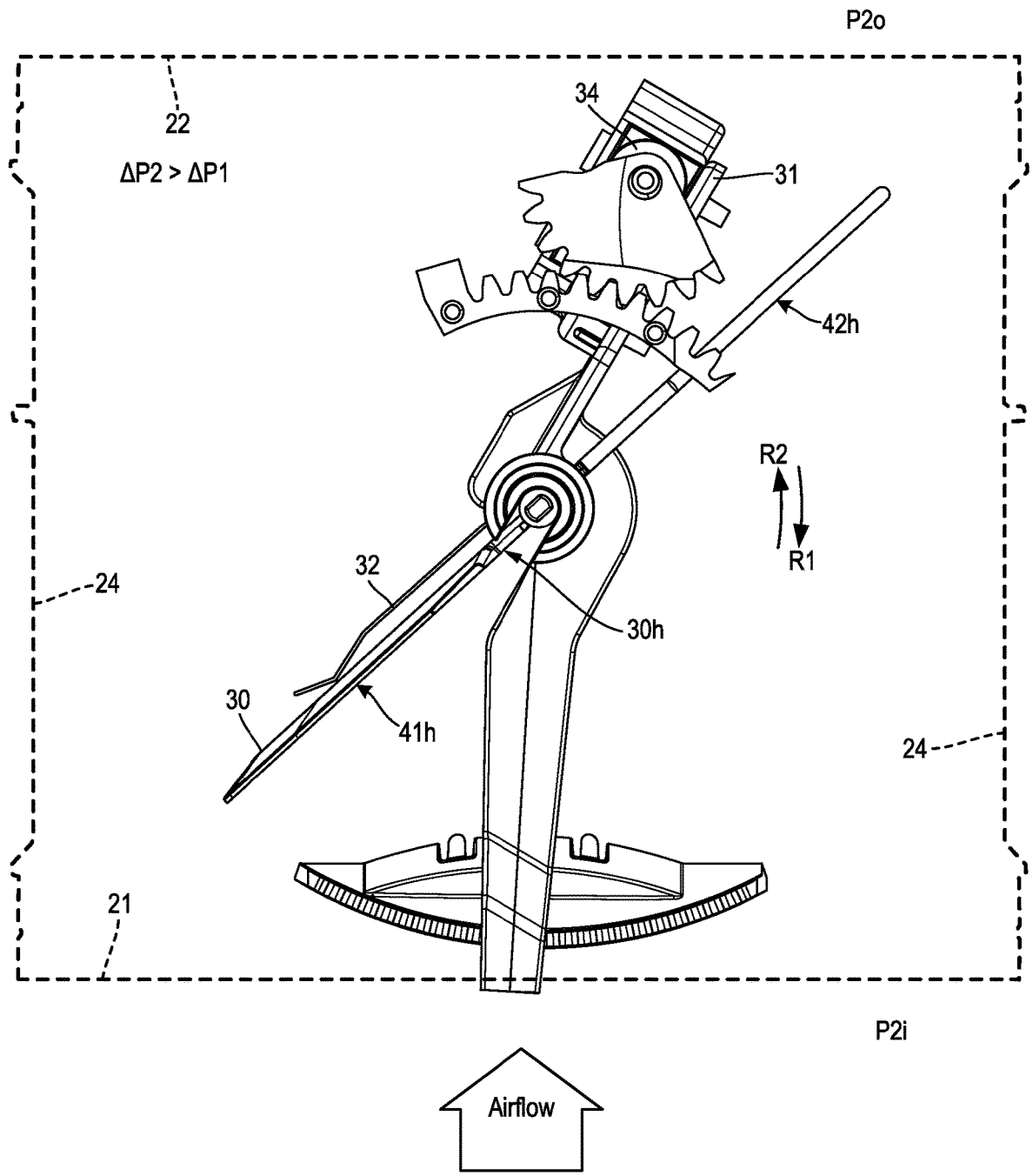
FIG. 5B is a top view of the plate assembly of FIG. 3, but showing rotational displacement of a valve plate in response to increased inlet/outlet pressure differential.

The operation of the valve plate 30, the adjustment plate 31, and the spring 32 to control airflow is shown in FIGS. 5A and 5B. FIG. 5A is a top view of an assembled plate assembly 27. Broken lines show the approximate boundary of the airflow conduit 24 (at a height approximately halfway between the top and bottom surfaces of the airflow conduit 24), the inlet 21, and the outlet 22 in an assembled airflow valve 10. The adjustment plate 31 has been placed, by operation of the actuator 34, into a rotational position corresponding to a desired airflow volume. In FIG. 5A, a pressure difference $\Delta P1$ represents a difference between the pressure P1i at the inlet 21 and the pressure P1o at the outlet 22 ($\Delta P1 = P1i - P1o$). The airflow resulting from the pressure difference $\Delta P1$ creates forces on a high pressure face 30h, of the valve plate 30, that faces the airflow. Because of the shape of the valve plate 30 (e.g., because a side 41h of the face 30h corresponding to the first portion 41 of the valve plate 30 has a greater area than a side 42h corresponding to the second portion 42), a moment about axis A2, in the direction R1, resulting from the force on the side 41h may be greater than a moment about axis A2, in the direction R2, resulting from the force on the side 42h. At the angular position of the valve plate 30 shown in FIG. 5A, that difference in moments is insufficient to overcome the biasing force of the spring 32.

FIG. 5B is a top view of an assembled plate assembly 27 similar to FIG. 5A. In FIG. 5B, a pressure difference ΔP2 represents a difference between the pressure P2i at the inlet 21 and the pressure P2o at the outlet 22 (ΔP2=P2i−P2o), with ΔP2>ΔP1. The airflow resulting from the pressure difference ΔP2 again creates forces on the high pressure face 30h of the valve plate 30. In the example of FIG. 5B, a difference between the moment about axis A2 in the direction R1 and a moment about axis A2 in the direction R2 is sufficient to overcome the biasing force of the spring 32. As a result, the valve plate 30 rotates in the direction R1. This new position of the valve plate 30 obstructs a larger portion of the flow area of the airflow conduit 24.

Figure 6:
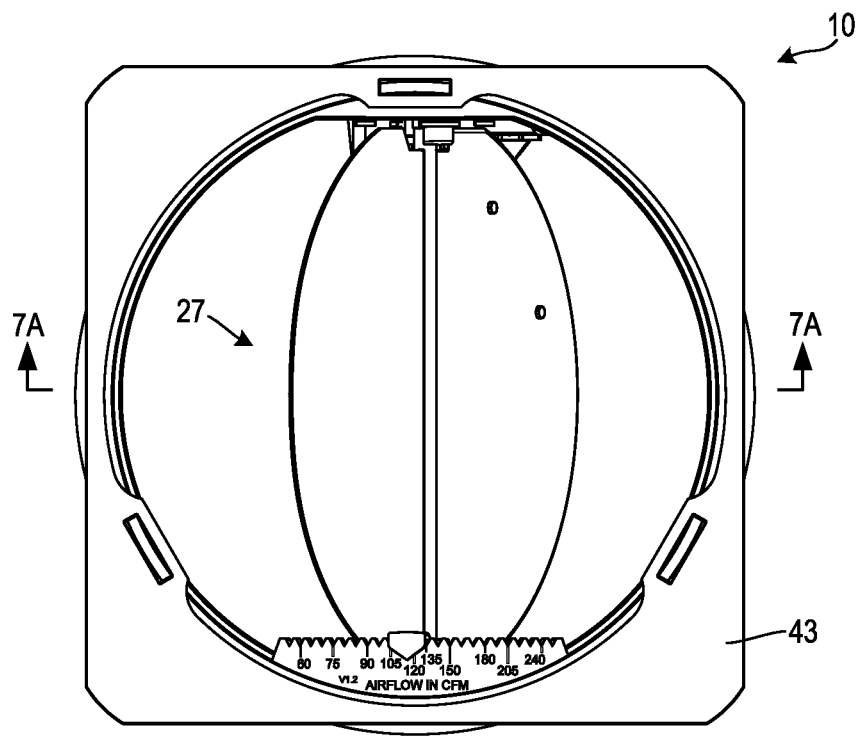
FIG. 6 is a front view of the airflow balancing valve of FIG. 1A.
Figure 7A:
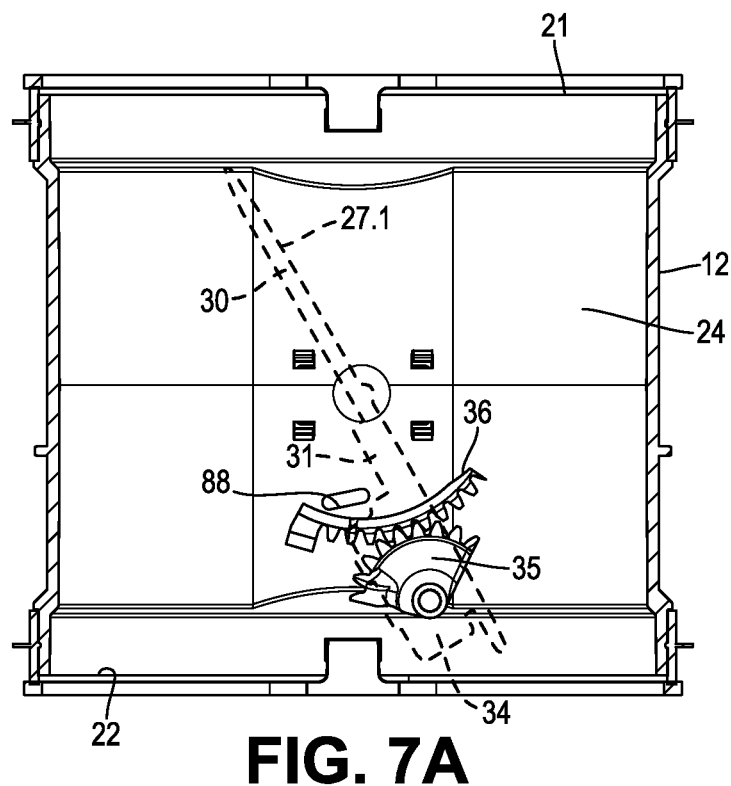
FIGS. 7A, 7B, and 7C are partially diagrammatic views, of portions of the airflow balancing of FIG. 1A, showing configuration for different airflow volumes.
Figure 7B:
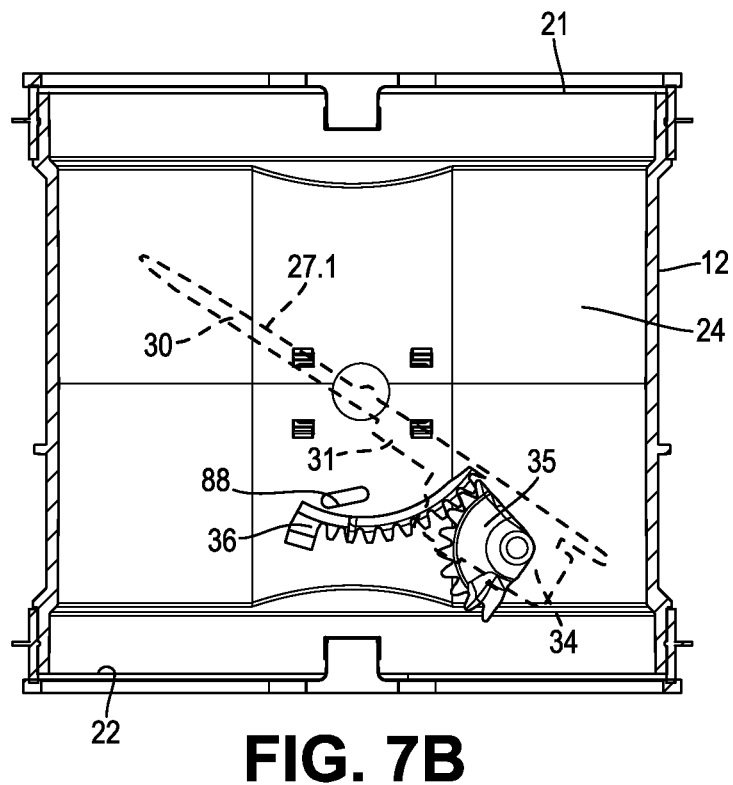
Figure 7C:
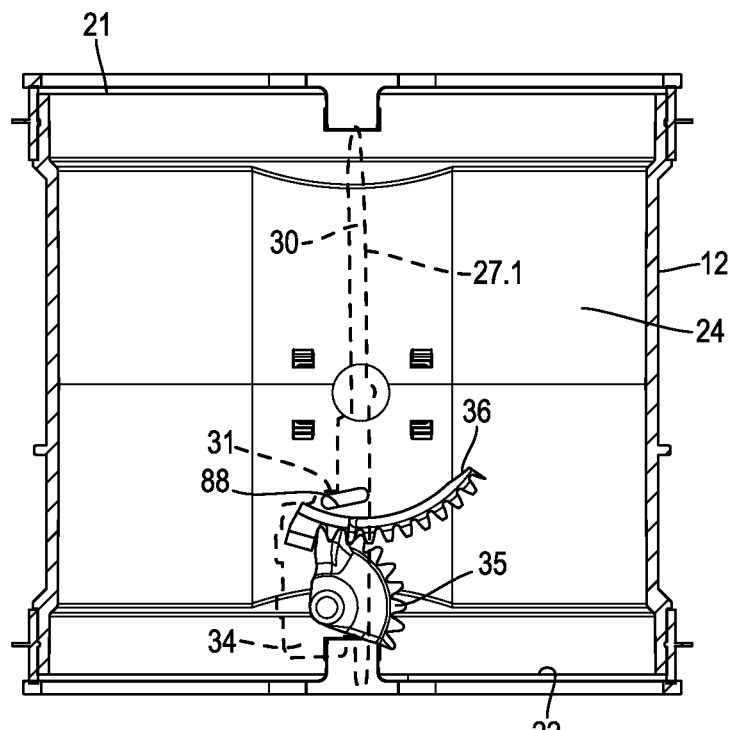

FIG. 6 is a front view of the airflow balancing valve 10. FIGS. 7A, 7B, and 7C are partially diagrammatic views, of portions of the airflow balancing valve 10, showing configuration to achieve different airflow volumes. In FIGS. 6-7C, no air is flowing via the airflow valve 10.

FIG. 7A is a partially diagrammatic cross-sectional view taken from the location indicated in FIG. 6. In FIG. 7A, a broken line silhouette 27.1 replaces certain portions of the plate assembly 27 that have been omitted for convenience. In FIG. 7A, the actuator gear 35 has a first position that approximately in the middle of the conduit gear 36. The silhouette 27.1 shows the general position of the valve plate 30, the adjustment plate 31, and the actuator 34 that correspond to the first position of the actuator gear 35.

FIG. 7B is a partially diagrammatic cross-sectional view similar to FIG. 7A, but further showing the actuator 35 moved to a second position. In particular, the shaft 74 of the actuator 34 was rotated in the direction R11, which corresponds to counterclockwise rotation of the actuator gear 35 in FIGS. 7A-7C. Because teeth of the actuator gear 35 intermesh with teeth of the conduit gear 36, the rotation of the actuator shaft 74 caused the actuator gear 35 to move to the position shown in FIG. 7B. The silhouette 27.1 shows the general position of the valve plate 30, the adjustment plate 31, and the actuator 34 that correspond to the second position of the actuator gear 35. The configuration of FIG. 7B may correspond to an airflow rate lower than an airflow rate that corresponds to the configuration of FIG. 7A.

FIG. 7C is a partially diagrammatic cross-sectional view similar to FIGS. 7A and 7B, but further showing the actuator 35 moved to a third position. In particular, the shaft 74 of the actuator 34 was rotated in the direction R22, which corresponds to clockwise rotation of the actuator gear 35 in FIGS. 7A-7C. Because teeth of the actuator gear 35 intermesh with teeth of the conduit gear 36, the rotation of the actuator shaft caused the actuator gear 35 to move to the position shown in FIG. 7C. The silhouette 27.1 shows the general position of the valve plate 30, the adjustment plate 31, and the actuator 34 that correspond to the third position of the actuator gear 35. The configuration of FIG. 7C may correspond to an airflow rate higher than an airflow rate that corresponds to the configuration of FIG. 7A.

Also visible in FIGS. 7A through 7C is an opening 88 in the top side of the housing 12. One or more wires used to transmit electrical power and/or control signals to the actuator 34 may be routed via the opening 88.

Figure 8A:
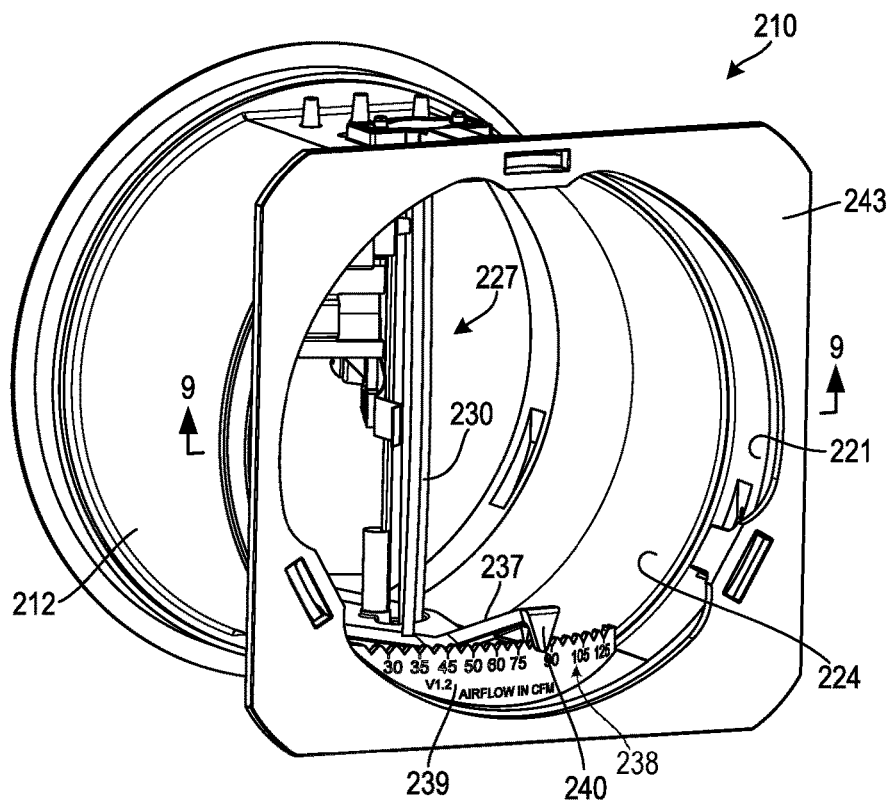
FIG. 8A is an upper front perspective view of another example airflow balancing valve.
Figure 8B:
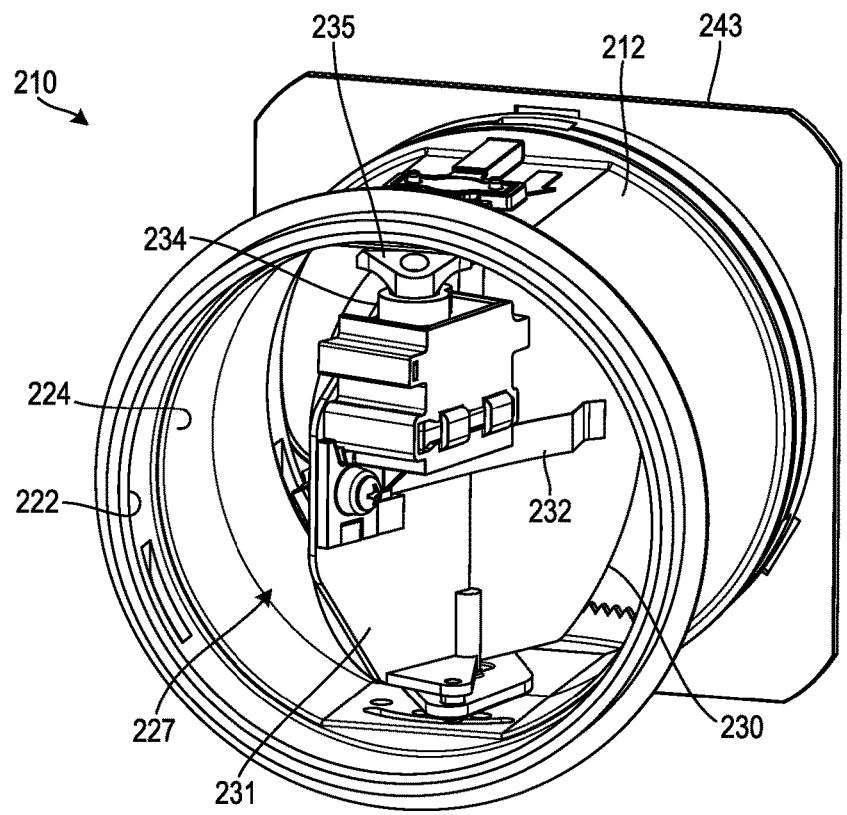
FIG. 8B is an upper rear perspective view of the airflow balancing valve of FIG. 8A.

FIG. 8A is an upper front perspective view of an example airflow balancing valve 210. FIG. 8B is an upper rear perspective view of the airflow balancing valve 210. The airflow balancing valve 210 is similar to the airflow balancing valve 10, and except as described below, operates similar to the airflow balancing valve 10. For each component of the airflow balancing valve 210 that is similar to a corresponding component of the airflow balancing valve 10, the reference number is offset from the reference number of the corresponding airflow balancing valve 10 component by 200.

The airflow balancing valve 210 comprises a housing 212, open front and rear ends of which define an inlet 221 and an outlet 220, with an interior surface of the housing 212 defining an airflow conduit 224. A front flange 243 may be attached to the housing 212 in a manner similar to that described for the front flange 43 and the housing 12. Although not shown, a rear flange could also be attached. An indicator gauge 239 may comprise markings 238 indicating airflow volumes corresponding to different settings of the airflow valve 210, which markings 238 may be indicated by a point on an end face 240 of an indicator arm 237.

The airflow balancing valve may comprise a plate assembly 227 that is rotatably mounted to the housing 212 in the airflow conduit 224. The plate assembly 227 may comprise a valve plate 230 and an adjustment plate 231. The valve plate 230 and the adjustment plate 231 may be rotatable relative to the housing 212 and relative to each other. A rotational axis of the valve plate 230 may be offset from a rotational axis of the adjustment plate 231. A spring 232 may bias the valve plate 230 to a rotational home position in which the a portion of the valve plate 230 is pushed against and/or toward the adjustment plate 231. An actuator 234 may be fixed relative to the adjustment plate 231. An actuator gear 235 may be attached to the actuator.

Figure 9:
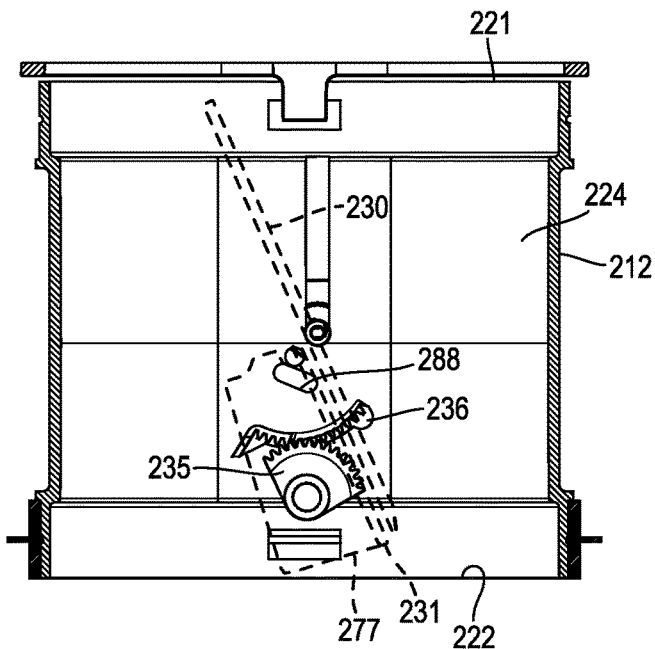
FIG. 9 is a partially diagrammatic cross-sectional view taken from the location indicated in FIG. 8A.

FIG. 9 is a partially diagrammatic cross-sectional view taken from the location indicated in FIG. 8A. In FIG. 9, all components of the plate assembly 227 except the actuator gear 235 have been omitted. However, broken line silhouettes show the general positions of the valve plate 230, the adjustment plate 231, and a housing 277 of the actuator 34 that correspond to the position of the actuator gear 235 shown in FIG. 10. The actuator gear 235 may be rotated by the actuator 234. If the actuator 234 rotates the actuator gear clockwise in the view of FIG. 10, the actuator gear 235 may move toward one end of a conduit gear 236 mounted inside the airflow conduit 224, and the adjustment plate 231 and the valve plate 230 will rotate in a first direction. If the actuator 234 rotates the actuator gear counterclockwise in the view of FIG. 10, the actuator gear 235 may move toward the other end of the conduit gear 236, and the adjustment plate 231 and the valve plate 230 will rotate in a second direction opposite the first direction.

Figure 10:
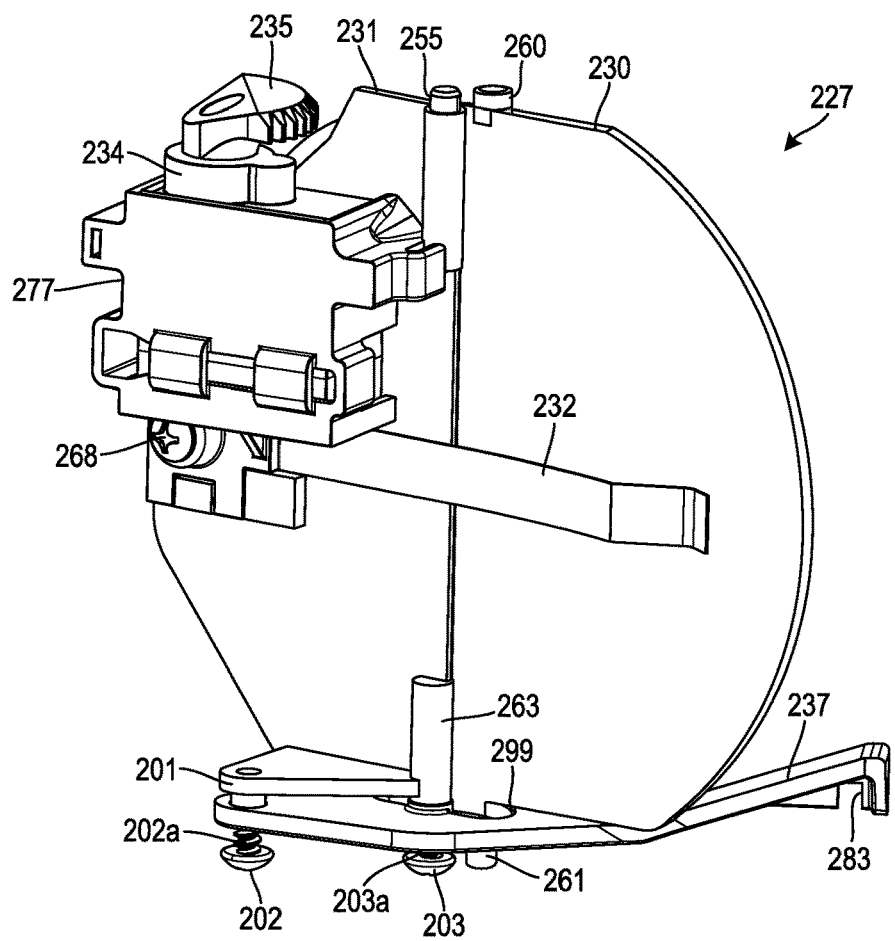
FIG. 10 is a front perspective view of a plate assembly of the example airflow balancing valve of FIG. 8A.

FIG. 10 is a front perspective view of the plate assembly 227 removed from the airflow valve 210, and is enlarged relative to FIGS. 8A through 9. The valve plate 230 comprises axles 260 and 261. In the assembled airflow valve 210, the axles 260 and 261 may extend through openings in the top and bottom sides of the housing 212 and be rotatable with those openings. The axle 261 may extend through an arcuate slot 299 in the indicator arm 237. The adjustment plate 231 may include an axle 255. The adjustment plate 231 may be attached to a rear end of the indicator arm 237 by screws 202 and 203. The screws 202 and 203 may be installed from outside the housing 212 while the other components of the plate assembly 227 are in the airflow conduit 224. After assembly, gaps may remain between the heads of the screws 202 and 203 and the underside of the indicator arm 237, exposing portions 202a and 203a of the shafts of those screws.

Figure 11A:
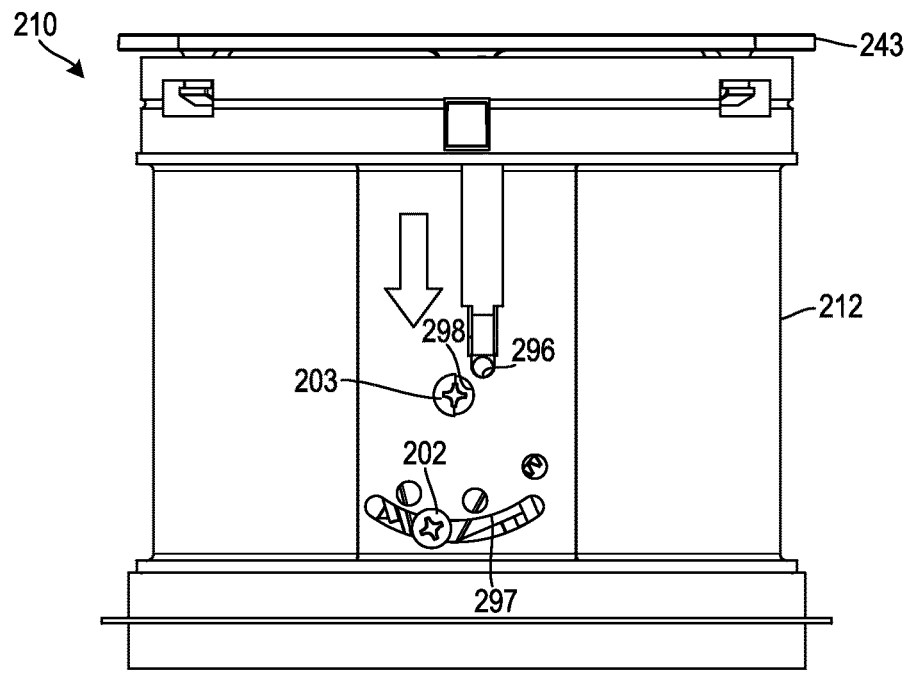
FIG. 11A is a bottom view of the airflow balancing valve of FIG. 8A.

FIG. 11A is a bottom view of the airflow valve 210 showing the locations of the screws 202 and 203 in the assembled airflow valve 210. A part of the screw 203 is removed to show an opening 298 in the housing 212 through which the screw 203 may be inserted during assembly. The screw 202 may be inserted through an arcuate slot 297 during assembly. The exposed portion 203a of the screw 203 is located in, and may rotate within, the opening 298. The exposed portion 202a of the screw 202 may travel in an arcuate path with the slot 297. Also visible in FIG. 11A is an end of the axle 261 in an opening 296 of the housing 212.

Figure 11B:
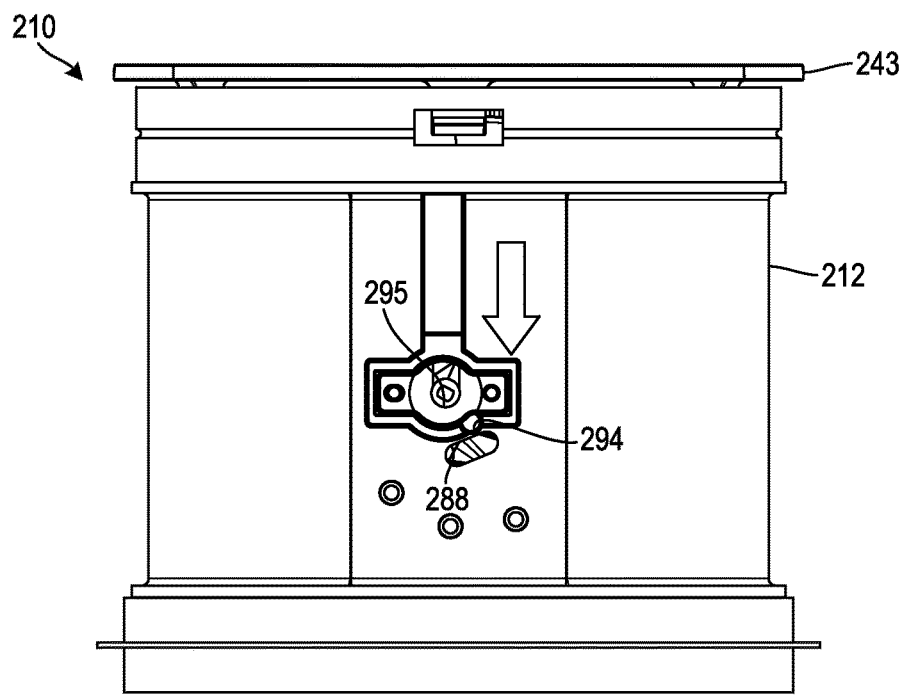
FIG. 11B is a top view of the airflow balancing valve of FIG. 8A.

FIG. 11B is a top view of the airflow valve 210. A cap is removed to show an opening 295 in which axle 260 rests and within which axle 260 may rotate. Also visible is an opening 294 in which axle 255 rests and within which axle 255 may rotate. A rotational axis of the valve plate 230 extends through the openings 295 (FIG. 11B) and 296 (FIG. 11A). A rotational axis of the adjustment plate 231 extends through the openings 298 (FIG. 11B) and 294 (FIG. 11A).

Figure 12:
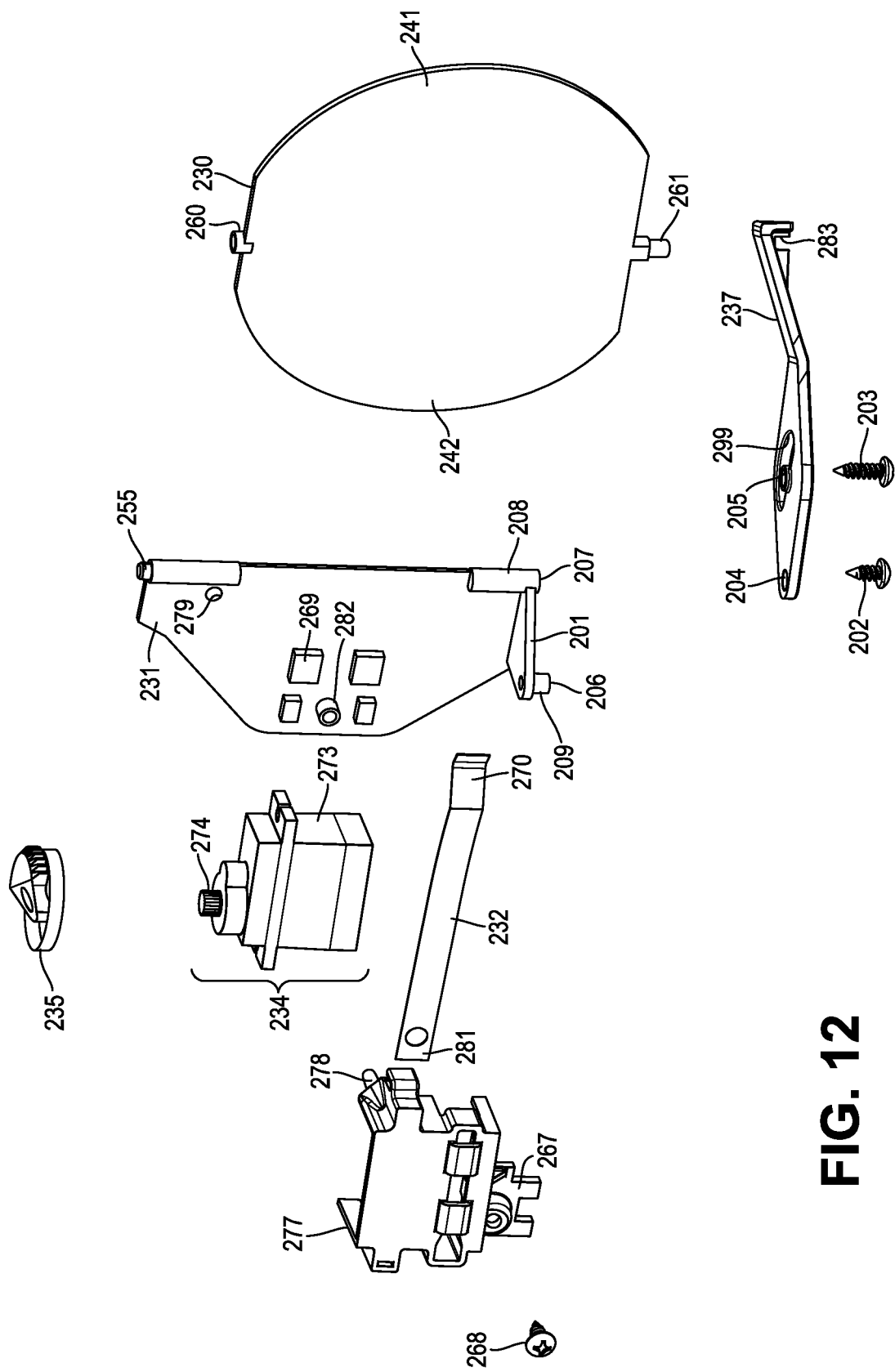
FIG. 12 is an exploded view of the plate assembly of FIG. 10.

FIG. 12 is an exploded view of the plate assembly 227. The actuator 234, which may be the same as or similar to the actuator 34, may comprise a main body 273 and a shaft 274. One or more wires, not shown, may extend from the main body 273, may be used to provide power and control signals to the actuator 234, and may be routed via the opening 288 (FIGS. 9 and 11B). The actuator gear 235 may be fixed relative to the shaft 274 by inserting the shaft 274 into a hole in the underside of the actuator gear 235. The actuator 234 may be attached to the adjustment plate 231 by an actuator housing 277. A mounting post 278 of the housing 277 may be inserted into a hole 279 in the adjustment plate 231 during assembly. After insertion into the hole 279, an end of the mounting post 278 protruding through the opposite side of the adjustment plate 231 may flattened. A bracket 269 may comprise blocks formed on the face of the access panel 231 that define spaces to receive a first end 281 of the spring 232 and to interlock with a clamp 267 (which may be integral to the housing 277), as well as a post 282 configured to protrude through a hole in the first end 281 and to receive the screw 268.

As indicated above, the adjustment plate 231 may be attached to the indicator arm 237 by the screws 202 and 203. The screw 202 passes through a hole 204 and into a hole in 206 in the bottom of a post 209. The screw 203 passes through a hole 205 and into a hole in 207 in the bottom of a boss 208. A gap 283 formed in the underside of the arm 237 allows the arm 237 to move over the indicator gauge 239 without interference. In the assembled airflow valve 210, the indicator gauge 239 is positioned so that it rests in the gap 283 as the adjustment plate 231 rotates.

A first portion 241 of the valve plate 230, located on one side of a centerline (e.g., similar to the centerline C shown in FIG. 4) extending through the centers of the axles 260 and 261, may extend toward the inlet 221 in the assembled airflow valve 210. A second portion 242 of the valve plate 230, located on the other side of that centerline, may extend toward the outlet 222 in the assembled airflow valve 210. On each face of the valve plate 230, the portion of that face corresponding to the first portion 241 may have a larger area that the portion of that face corresponding to the second portion 242.

Figure 13A:
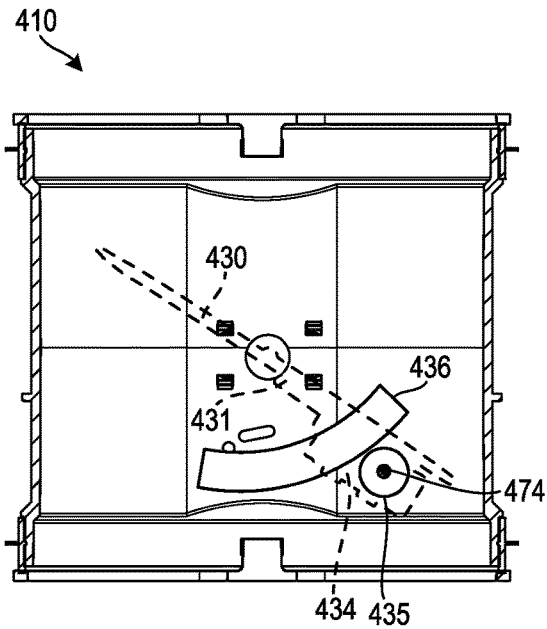
FIGS. 13A and 13B are partially diagrammatic cross-sectional views of another example airflow valve.
Figure 13B:
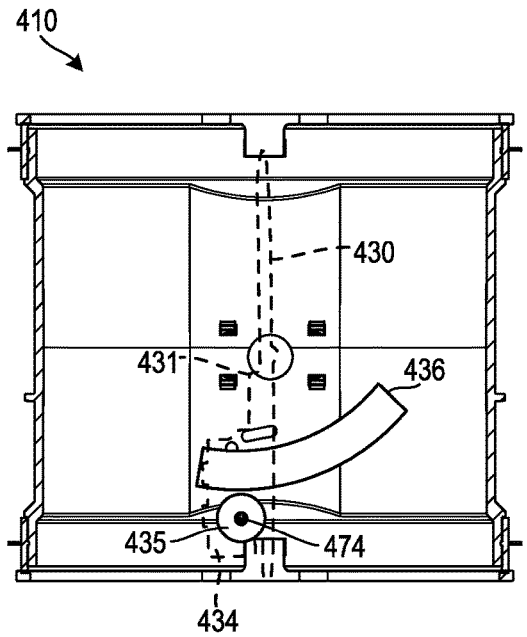

In the examples of the airflow valves 10 and 210, actuators are coupled to an interior surface of an airflow conduit via gears. An actuator could be coupled to an interior of an airflow conduit using other configurations. For example, and as shown in FIGS. 13A and 13B, an actuator could be coupled to an airflow conduit using a wheel configured to roll along an arcuate bracket. FIGS. 13A and 13B are partially diagrammatic cross-sectional views, from a location similar to that used for FIG. 7A, of an airflow valve 410. The airflow valve 410 may be similar to the airflow valve 10. However, the actuator gear 35 and the conduit gear 36 have been replaced with a wheel 435 and an arcuate track 436. The wheel 435 may be mounted to a shaft 474 of an actuator 434. An outer perimeter of the wheel 435 may be configured to roll along a surface of the track 436 in response to rotation of the shaft 474, thereby rotating a valve plate 430 and actuator plate 431. For example, rotation of the shaft 474 clockwise in the view of FIG. 13A causes the valve plate 430 and the actuator plate 431 to rotate to the position shown in FIG. 13B. The outer perimeter of the wheel 435 and/or the surface of the track 436 on which the wheel 435 rolls may be formed from a material with high friction (e.g., rubber) and/or otherwise treated to increase rolling friction.

Figure 14A:
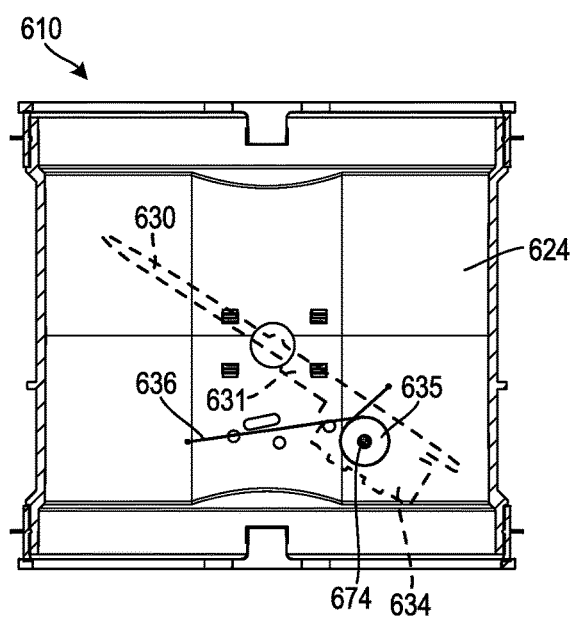
FIGS. 14A and 14B are partially diagrammatic cross-sectional views of another example airflow valve.
Figure 14B:
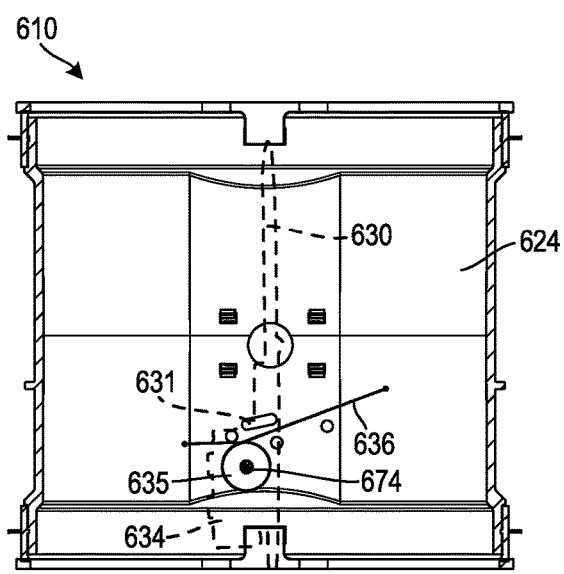

As another example, and as shown in FIGS. 14A and 14B, an actuator could be coupled to an airflow conduit using a pulley. FIGS. 14A and 14B are partially diagrammatic cross-sectional views, from a location similar to that used for FIG. 7A, of an airflow valve 610. The airflow valve 610 may be similar to the airflow valve 10. However, the actuator gear 35 and the conduit gear 36 have been replaced with a pulley 635 and a cord 636. The pulley 635 may be mounted to a shaft 674 of an actuator 634. The cord 636 may be wrapped around an outer perimeter of the pulley 635 (e.g., using multiple turns), with free ends of the cord 636 pulled taught and attached to an interior surface of an airflow conduit 624. Rotation of the pulley 635 (in response to rotation of the shaft 674) simultaneously pays out one end of the cable 636 and takes up the other end of the cable, thereby rotating a valve plate 630 and actuator plate 631. For example, rotation of the pulley 635 clockwise in the view of FIG. 14A cause the valve plate 630 and the actuator plate 631 to rotate to the position shown in FIG. 14B.

The above examples are not exhaustive. As but another example, a linear actuator (e.g., a screw-type linear actuator, a piston-type linear actuator, a solenoid-type linear actuator) could be pivotably mounted to an adjustment plate (e.g., with the pivot axis being orthogonal to a extension axis of the linear actuator). An extendable end of that linear actuator could then be coupled to a surface of an airflow conduit. Moreover, other components of an airflow valve described above could be modified. For example, an actuator need not be electrically powered. Pneumatic actuators and/or hydraulic actuators could be used.

Figure 15:
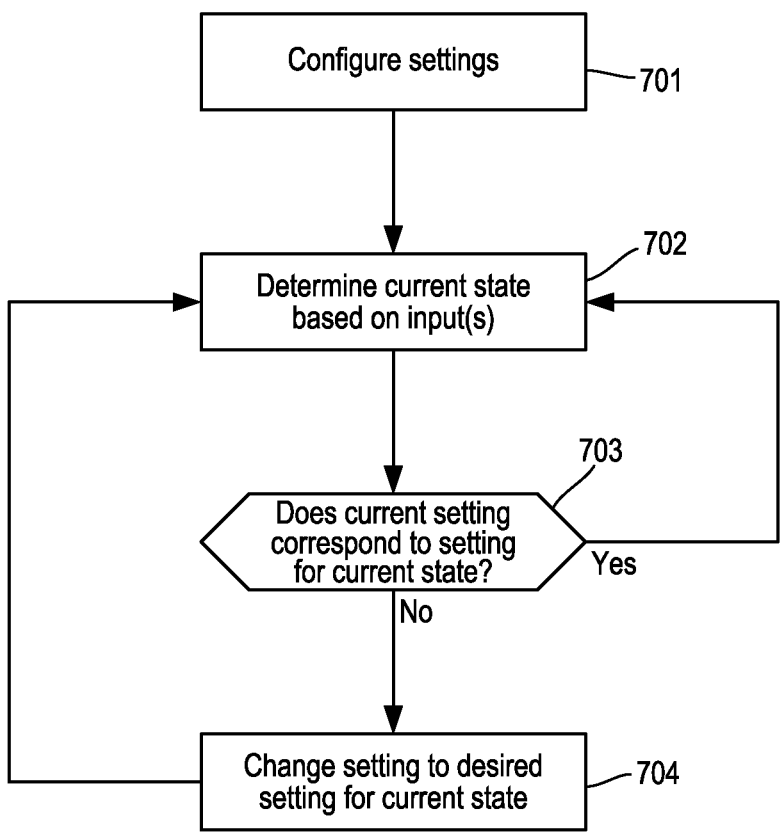
FIG. 15 is a flow chart showing an example method of using an airflow valve.

FIG. 15 is a flow chart of an example method of using an airflow valve such as one of those described herein. One or more steps of the example method of FIG. 15 may be performed by a computing device comprising one or more processors and memory storing instructions that, when executed by the one or more processors, cause the computing device to perform steps of the example method. The computing device performing steps of the method of FIG. 15 may receive inputs from one or more sensors (e.g., temperature sensors, occupancy sensors, etc.) and may be configured to send control signals to an actuator (e.g., to an electrical servo, to one or more valves to control a pneumatic or hydraulic actuator, etc.).

In a first step 701, the computing device may be configured to map settings of an airflow valve to one or more states. A state may comprise a condition of a room or other space (e.g., occupied, not occupied, a temperature), a time (e.g., a time of year and/or a time of day), and/or another parameter. A state may comprise a single value (e.g., occupied, not occupied, day, night) and/or may comprise a combination of values (e.g., occupied at night, not occupied at night, occupied during the day, not occupied during the day, occupied when outside temperature is above a certain value, not occupied when outside temperature is above a certain value, etc.). A configuration file created in the first step 701 may map an airflow valve setting to each of multiple states. Each of the mapped settings may be different, or some of the mapped settings may be the same. Each of the settings may be stored as data indicating a command to be sent to an actuator to cause the actuator to rotate an airflow valve adjustment plate to a position corresponding to a desired airflow volume.

In step 702, the computing device may determine a current state based on one or more inputs. For example, the computing device may determine if a room is occupied based on a signal from an occupancy sensor in that room, from a signal indicating if lights in the room are turned on or off, etc. As another example, the computing device may determine a time based on an internal clock. As but another example, the computing device may determine an outside temperature based on a signal from a temperature sensor.

In step 703, the computing device may determine if a current setting of the airflow valve corresponds to a setting mapped to the current state determined in the most recent performance of step 702. The current setting may be determined, e.g., based on a default value (e.g., if step 703 is being performed for the first time), based on a value stored from a previous change of the setting, and/or based on other input(s). If the computing device determines in step 703 that the current setting corresponds to the setting for the current state, step 702 may be repeated. If the computing device determines in step 703 that the current setting does not correspond to the setting for the current state, step 704 may be performed. In step 704, the computing device may send a signal that causes an actuator (e.g., one of the actuators described above) to move an adjustment plate to a position associated with the setting corresponding to the current state. That actuator may then perform actions, such as are described above, that result in the airflow valve adjustment plate being rotated. After step 704, step 702 may be repeated.

The foregoing has been presented for purposes of example. The foregoing is not intended to be exhaustive or to limit features to the precise form disclosed. The examples discussed herein were chosen and described in order to explain principles and the nature of various examples and their practical application to enable one skilled in the art to use these and other implementations with various modifications as are suited to the particular use contemplated. The scope of this disclosure encompasses, but is not limited to, any and all combinations, subcombinations, and permutations of structure, operations, and/or other features described herein and in the accompanying drawing figures.

The invention claimed is:

1. An airflow valve comprising:
   a housing defining an inlet, an outlet, and a conduit between the inlet and the outlet;
   an adjustment plate located in the conduit and configured to rotate about an adjustment plate axis, wherein the adjustment plate extends from the adjustment plate axis toward the outlet;
   a valve plate located in the conduit and configured to rotate, separately from the adjustment plate, about a valve plate axis, wherein the valve plate comprises a first portion extending from the valve plate axis toward the inlet and a second portion extending from the valve plate axis toward the outlet;
   a spring biasing the valve plate to a home position relative to the adjustment plate;
   an actuator, fixed relative to the adjustment plate, comprising an actuator shaft that is rotatable in response to an input signal;
   an actuator gear fixed relative to the actuator shaft; and
   a conduit gear fixed relative to the housing, wherein the actuator shaft is coupled to an interior surface of the housing via the actuator gear and the conduit gear, and wherein the airflow valve is configured to rotate the adjustment plate about the adjustment plate axis by rotating the actuator shaft while the actuator gear contacts the conduit gear.

2. The airflow valve of claim 1, wherein the actuator is electrically powered.

3. The airflow valve of claim 1, wherein the actuator is located in the conduit and is displaced from the adjustment plate axis.

4. The airflow valve of claim 1, wherein the actuator is attached to a face of the adjustment plate oriented toward the outlet and is displaced from the adjustment plate axis.

5. The airflow valve of claim 1, further comprising:
   an indicator arm, fixed relative to the adjustment plate, extending from the adjustment plate axis toward the inlet; and
   an indicator gauge, located under a distal end of the indicator arm, comprising a plurality of markings indicating settings of the airflow valve.

6. The airflow valve of claim 1, wherein the actuator shaft is completely contained within the conduit.

7. The airflow valve of claim 1, wherein the actuator comprises a servo attached to the adjustment plate by an actuator housing.

8. An airflow valve comprising:
   a housing defining an inlet, an outlet, and a conduit between the inlet and the outlet;
   an adjustment plate located in the conduit, wherein the adjustment plate is rotatably coupled to the housing and configured to rotate about an adjustment plate axis;
   a valve plate located in the conduit, wherein the valve plate is rotatably coupled to the housing and configured to rotate, separately from the adjustment plate, about a valve plate axis;
   a spring biasing the valve plate toward the adjustment plate;
   an actuator, fixed relative to the adjustment plate, comprising an actuator shaft that is rotatable in response to an input signal;
   an actuator gear fixed relative to the actuator shaft; and
   a conduit gear, fixed relative to the housing and located in the conduit, comprising one or more gear teeth in contact with one or more gear teeth of the actuator gear, wherein the airflow valve is configured to rotate the adjustment plate about the adjustment plate axis by rotating the actuator shaft while the actuator gear contacts the conduit gear.

9. The airflow valve of claim 8, wherein the actuator is electrically powered.

10. The airflow valve of claim 8, wherein the conduit gear is located within a portion of the conduit that extends from the adjustment plate axis to the outlet.

11. The airflow valve of claim 8, wherein the actuator is attached to a face of the adjustment plate oriented toward the outlet.

12. The airflow valve of claim 8, further comprising:
an indicator arm, fixed relative to the adjustment plate, extending from the adjustment plate axis toward the inlet; and
an indicator gauge, located under a distal end of the indicator arm, comprising a plurality of markings indicating settings of the airflow valve.

13. The airflow valve of claim 12, further comprising:
a second housing fixing the actuator and an end of the spring to the adjustment plate.

14. The airflow valve of claim 8, wherein the actuator is attached to a face of the adjustment plate at an edge of the adjustment plate.

15. An airflow valve comprising:
a housing defining an inlet, an outlet, and a conduit between the inlet and the outlet;
a plate assembly located in the conduit and rotatably mounted to the housing, the plate assembly comprising:
a first plate,
a second plate rotatable relative to the first plate,
a spring attached to the first plate and contacting the second plate,
an actuator attached to an edge of the first plate, and
an actuator gear fixed relative to an actuator shaft of the actuator; and
a conduit gear, fixed relative to the housing, comprising one or more gear teeth in contact with one or more gear teeth of the actuator gear, wherein the airflow valve is configured to rotate the first plate by rotating the actuator shaft while the actuator gear contacts the conduit gear.

16. The airflow valve of claim 15, wherein the actuator is electrically powered.

17. The airflow valve of claim 15, wherein the actuator is attached to a face of the first plate oriented toward the outlet and is displaced from a rotational axis of the first plate.

18. The airflow valve of claim 15, wherein the conduit gear is located in the conduit between the outlet and a rotational axis of the first plate.

19. The airflow valve of claim 15, wherein the plate assembly further comprises an indicator arm, fixed relative to the first plate, extending toward the inlet, and wherein the airflow valve further comprises:
an indicator gauge, located under a distal end of the indicator arm, comprising a plurality of markings indicating settings of the airflow valve.

20. The airflow valve of claim 15, wherein the plate assembly further comprises a second housing fixing the actuator and an end of the spring to the first plate.

* * * * *